US012610176B2

(12) United States Patent
Noh

(10) Patent No.: US 12,610,176 B2
(45) Date of Patent: Apr. 21, 2026

(54) HYBRID RECEIVER HAVING A BRACKET FOR INSTALLING A DRIVER

(71) Applicant: EM-TECH Co., Ltd., Gyeongsangnam-do (KR)

(72) Inventor: Young Seok Noh, Gyeongsangnam-do (KR)

(73) Assignee: EM-TECH Co., Ltd., Gyeongsangnam-do (KR)

( * ) Notice: Subject to any disclaimer, the term of this patent is extended or adjusted under 35 U.S.C. 154(b) by 125 days.

(21) Appl. No.: 18/621,548

(22) Filed: Mar. 29, 2024

(65) Prior Publication Data

US 2024/0348970 A1 Oct. 17, 2024

(30) Foreign Application Priority Data

Apr. 11, 2023 (KR) .......................... 1020230047541

(51) Int. Cl.

| | |
|---|---|
| ***H04R 1/24*** | (2006.01) |
| ***H04R 1/10*** | (2006.01) |
| ***H04R 1/28*** | (2006.01) |
| ***H04R 9/06*** | (2006.01) |
| ***H04R 11/02*** | (2006.01) |

(52) U.S. Cl.

CPC ......... *H04R 1/1091* (2013.01); *H04R 1/1016* (2013.01); *H04R 1/1075* (2013.01); *H04R 1/24* (2013.01); *H04R 1/2803* (2013.01); *H04R 9/06* (2013.01); *H04R 11/02* (2013.01); *H04R 2205/022* (2013.01)

(58) Field of Classification Search

CPC .. H04R 1/1016; H04R 1/1075; H04R 1/1091; H04R 1/24; H04R 1/2803; H04R 11/02; H04R 9/06; H04R 2205/022

See application file for complete search history.

(56) References Cited

U.S. PATENT DOCUMENTS

| | | | | |
|---|---|---|---|---|
| 10,477,295 | B2 * | 11/2019 | Ouchi | H04R 1/2896 |
| 11,395,060 | B2 * | 7/2022 | Ji | H04R 9/06 |
| 2014/0169583 | A1 * | 6/2014 | Huang | H04R 1/24 381/74 |

FOREIGN PATENT DOCUMENTS

| | | | |
|---|---|---|---|
| JP | 2022506786 | A | 1/2022 |
| KR | 20220039550 | A | 3/2022 |
| KR | 102442977 | B1 | 9/2022 |

* cited by examiner

*Primary Examiner* — Huyen D Le

(74) *Attorney, Agent, or Firm* — Murphy, Bilak & Homiller, PLLC

(57) ABSTRACT

A hybrid receiver includes: a first driver configured to reproduce sound in a first frequency range; a second driver configured to reproduce sound in a second frequency range which is higher than the first frequency range; and a bracket having a side wall covering a side of the first driver, an upper side attached to a top of a diaphragm of the first driver, and a sound emitting hole formed in the upper side and configured to emit sound produced by the first driver. A second driver receiving space is provided in the upper side of the bracket. A back hole of the second driver communicates with an upper space of the diaphragm of the first driver. A communicating hole is formed in the side wall of the bracket and through which air flows in or out of the upper space of the diaphragm of the first driver.

5 Claims, 7 Drawing Sheets

HYBRID RECEIVER HAVING A BRACKET FOR INSTALLING A DRIVER

BACKGROUND

Technical Field

An embodiment relates to a hybrid receiver having a bracket for installing a driver.

Background

Today, with the development of portable multimedia devices, high power output is needed for receivers that reproduce sound from multimedia devices, and hence, earphones using a hybrid receiver, a 2-way receiver, or a multi-driver and TWS earphones are becoming competitive in the market.

The sound pressure within an audible frequency range may be largely divided into low-frequency range, mid-frequency range, and high-frequency range and a typical sol driver has a limitation in covering sound pressure across all frequencies. Thus, a multi-driver may be employed such that the sound pressure in each frequency band reaches a target value.

In this case, a hybrid receiver, which is a combination of different types of drivers, requires a compact, stable mechanical structure for fixing each driver.

To address this, the applicant of the present disclosure proposed Korean Patent Registration No. 10-2442977, titled "A hybrid receiver having a bracket for fixing a driver".

FIG. 1 is a cross-sectional view schematically depicting an earphone fitted with a hybrid receiver having a bracket for fixing a driver according to the conventional art. A woofer speaker 10 and a tweeter speaker 20 are mounted on a bracket 50 for fixing a driver, thereby constituting a hybrid receiver. Once the hybrid receiver is mounted, an upper space of the hybrid receiver and a lower space of the hybrid receiver are insulated from each other by means of the hybrid receiver. Accordingly, the flow of air between the upper and lower spaces of the hybrid receiver is blocked, resulting in pressure differentials during use between inside the ear canal in which the earphone is plugged and the outside blocked out by the earphone, which may make the wearer feel pressure in the ear and cause fatigue in the eardrum. To solve this issue, there was proposed a structure in which the bracket 50 has an air pressure balancing hole 34 outside the woofer speaker 10. By applying a hybrid receiver with the air pressure balancing hole 34 to a closed-type earphone, air flow is permitted between upper and lower parts of the hybrid receiver, thereby decreasing the air pressure differentials between the ear canal and the outside and therefore reducing pain in the ear. A housing 51 defining the lower space of the hybrid receiver has an air hole 53 that communicates with the outside. In this case, a mesh (not shown) may be attached to the air hole 53 as well, and acoustic characteristics may be tuned by adjusting the airflow of the mesh (not shown).

Incidentally, while the hybrid receiver according to the conventional art only uses a high-frequency range of 10 kHz or higher as a frequency in which the tweeter speaker 20 operates, the frequency range required for reproduction is becoming increasingly wider, i.e., as low as 8 kHz and 3 kHz. Consequently, there is a need to extend the back volume of the tweeter speaker 20 so as to extend the frequency range of the tweeter speaker 20.

SUMMARY

An embodiment is directed to providing a hybrid receiver having a bracket for installing a driver, capable of providing a tweeter speaker with a sufficiently large back volume.

An embodiment of the present disclosure provides a hybrid receiver which is a combination of different types of drivers, comprising: a first driver for reproducing sound in a first frequency range; a second driver for reproducing sound in a second frequency range which is higher than the first frequency range; and a bracket for installing a driver, including a side wall covering a side of the first driver, an upper side attached to the top of a diaphragm of the first driver, and a sound emitting hole formed in the upper side, for emitting sound produced by the first driver, wherein a second driver receiving space is provided in the upper side of the bracket, a back hole of the second driver received in the second driver receiving space communicates with an upper space of the diaphragm of the first driver, and a communicating hole is formed in the side wall of the bracket, through which air flow in or out of the upper space of the diaphragm of the first driver.

In another aspect of the embodiment, the hybrid receiver may further comprise a mesh attached to the communicating hole, the airflow of which is adjustable.

In another aspect of the embodiment, the second driver may have a sound emitting hole for emitting sound in the same direction as the sound emitting hole of the first driver.

In another aspect of the embodiment, the back hole of the second driver may communicate directly with the upper space of the diaphragm of the first driver.

In another aspect of the embodiment, the bracket for installing a driver may have a hole or conduit capable of communicating with the back hole of the second driver, and the back hole of the second driver may communicate with the upper space of the diaphragm of the first driver through the hole or conduit formed in the bracket for installing a driver.

DETAILED DESCRIPTION

Hereinafter, an embodiment of the present disclosure will be described in detail with reference to the accompanying drawings.

Figure 1:
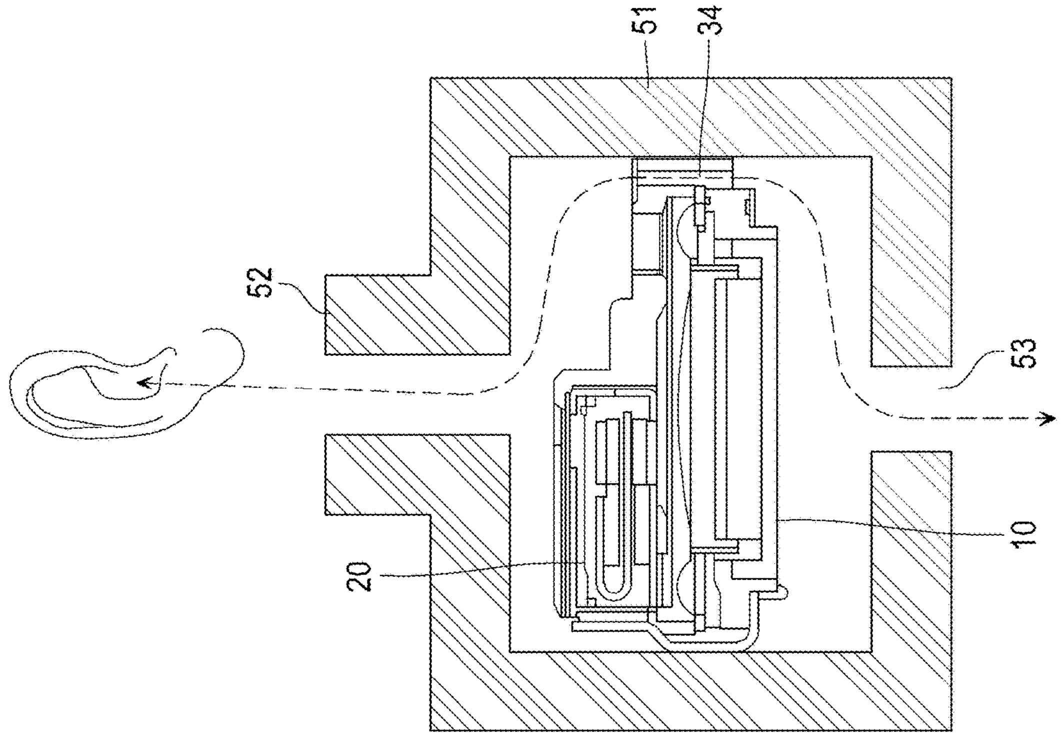
FIG. 1 (Prior Art)
FIG. 1 is a cross-sectional view schematically depicting an earphone fitted with a hybrid receiver having a bracket for fixing a driver according to the conventional art.
Figure 2:
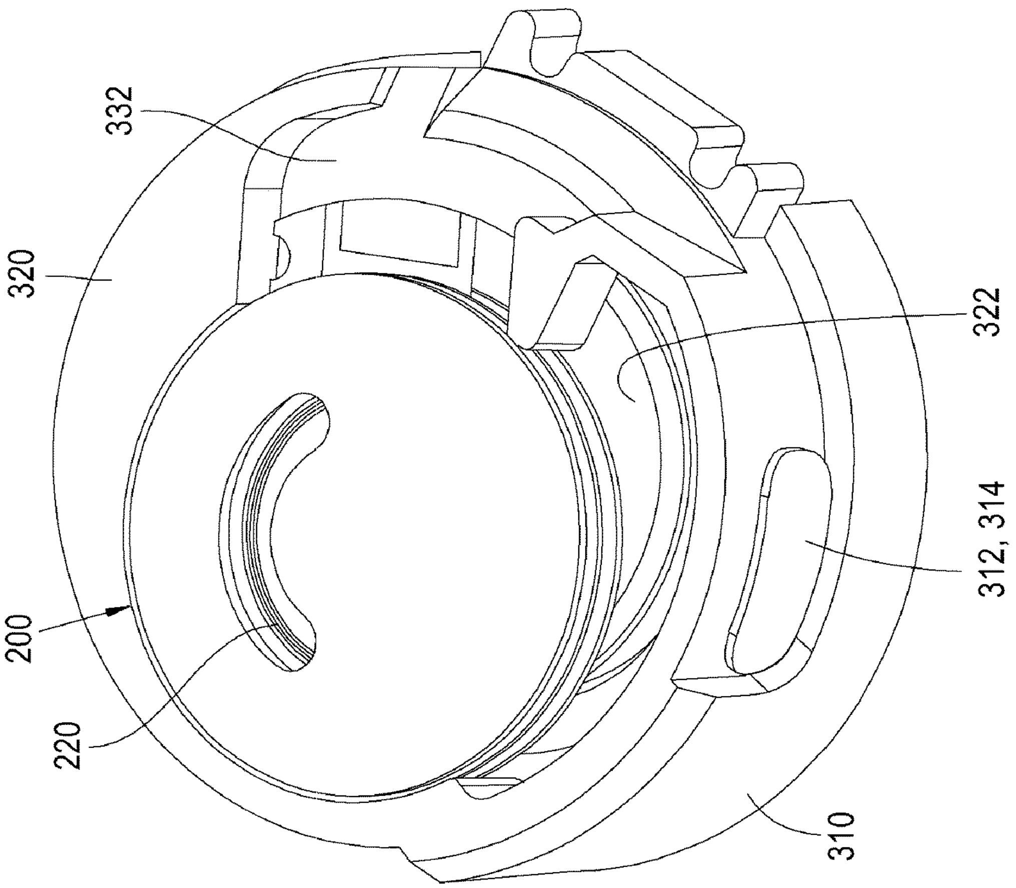
FIG. 2 is a perspective view of a hybrid receiver having a bracket for installing a driver according to an embodiment.

FIG. 2 is a perspective view of a hybrid receiver having a bracket for installing a driver according to an embodiment.

Figure 3:
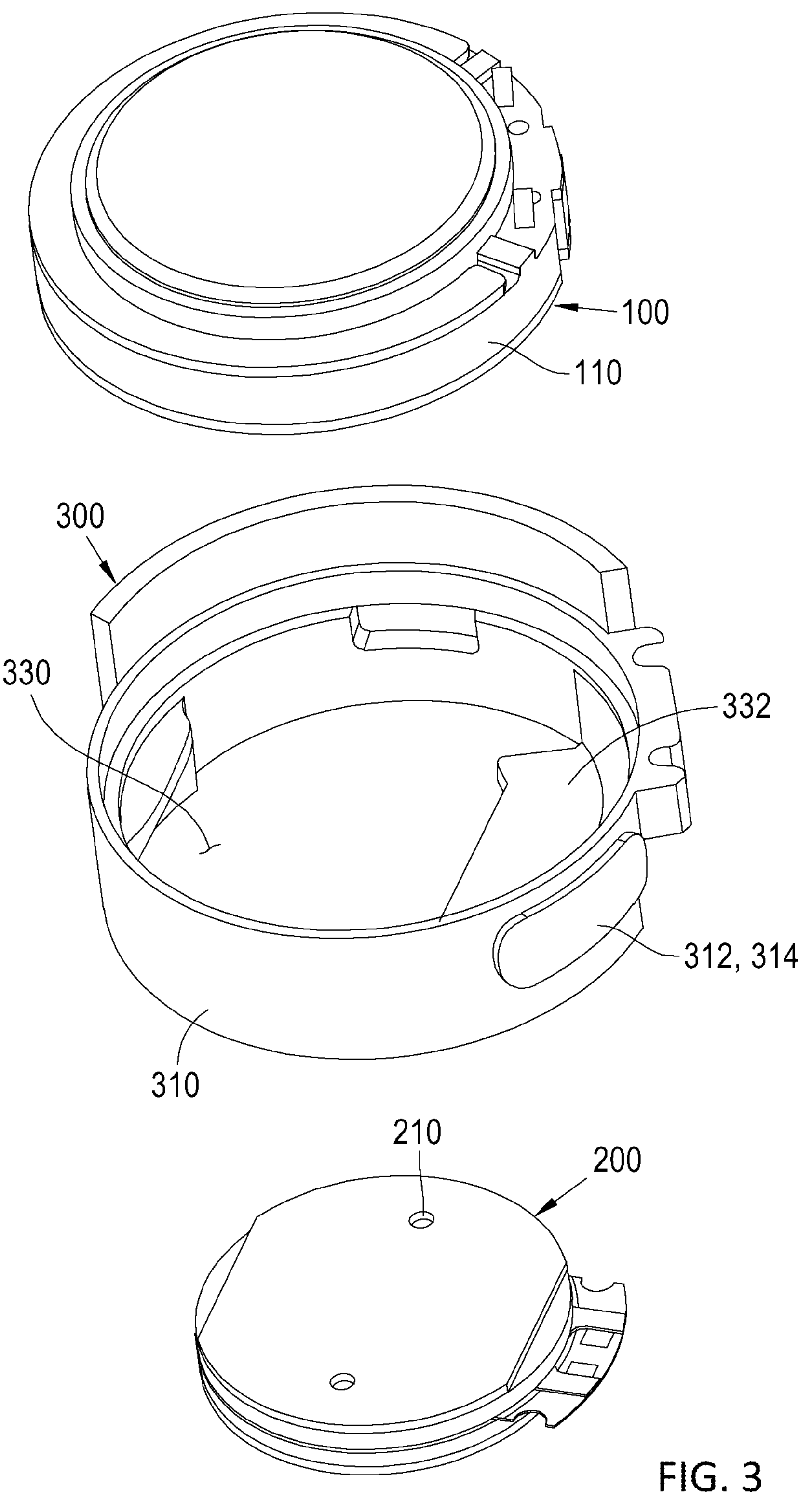
FIG. 3 is an exploded view of a hybrid receiver having a bracket for installing a driver according to an embodiment.

FIG. 3 is an exploded view of a hybrid receiver having a bracket for installing a driver according to an embodiment.

Figure 4:
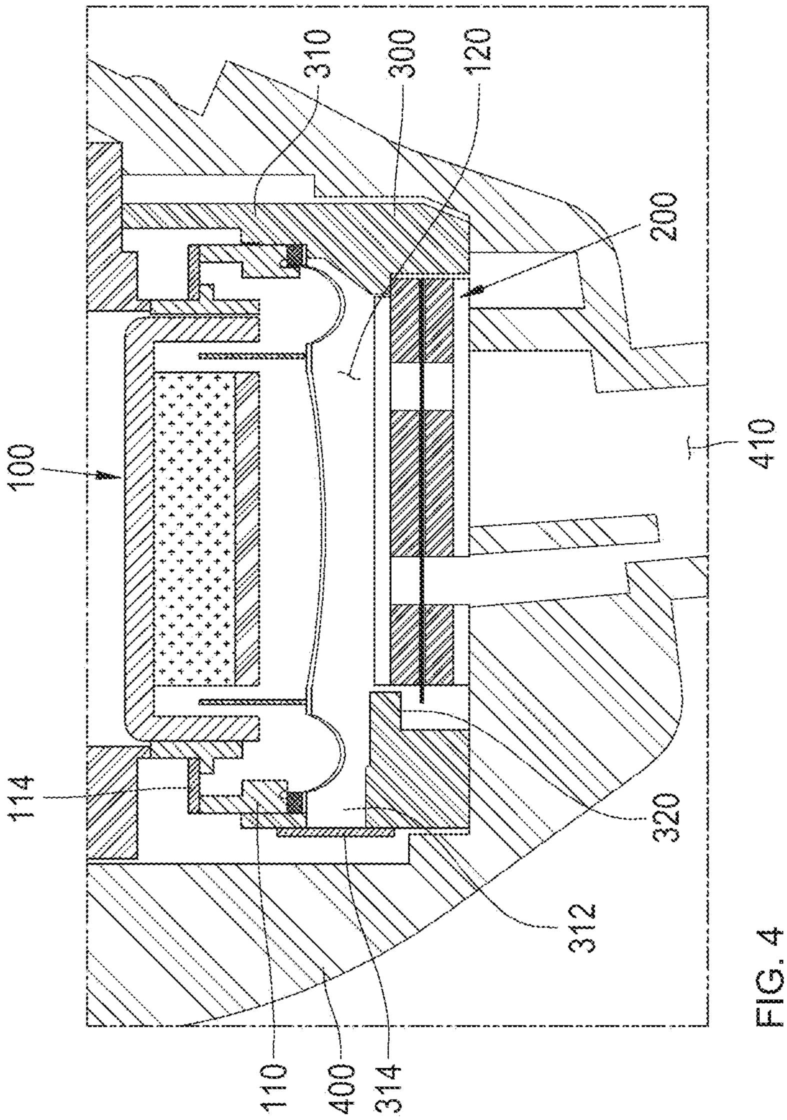
FIG. 4 is a cross-sectional view of a hybrid receiver having a bracket for installing a driver according to an embodiment.

FIG. 4 is a cross-sectional view of a hybrid receiver having a bracket for installing a driver according to an embodiment.

A hybrid receiver having a bracket for installing a driver according to an embodiment includes a first driver 100, a second driver 200, and a bracket 300 for fixing the drivers 100 and 200.

The first driver 100 according to the embodiment includes a frame 110 made of a plastic injection-molded material, a magnetic circuit, a voice coil, and a diaphragm that vibrates along with vibration of the voice coil. Also, a terminal capable of transmitting an electric signal to the voice coil may be attached to the frame or be formed integrally with it by insert injection molding.

The bracket 300 may include a side wall 310 attached to an outer side of the frame 110 and an upper side 320 covering the top of the first driver 100, that is, the top of the diaphragm.

In this case, a sound emitting hole 322 may be provided in the upper side 320 of the bracket 300 so as to emit sound produced from the diaphragm. A plurality of sound emitting holes 322 may be provided if necessary.

As the second driver 200, drivers that are great for high-frequency reproduction and miniaturization may be employed, such as a balanced amateur driver, a microspeaker using an FPCB (flexible printed circuit board) as a diaphragm, and a piezoelectric speaker. In the embodiment illustrated in the drawings, a microspeaker that has no diaphragm and no voice coil and instead uses an FPCB with a conductive pattern formed on a polymer film as a diaphragm is employed as the second driver 200.

The second driver 200 is formed on the upper side of the bracket 300, and the second driver 200 is mounted on the upper side of the bracket 300. To this end, a second driver receiving space 330 is provided in the upper side 320 of the bracket 300. The second driver receiving space 330 is formed by perforating the upper side 320, and has a mount 332 on which an edge of the second driver 200 sits so as to install the second driver 200 on it.

The second driver 200 has a sound emitting hole 220 at the top through which sound is emitted and a back hole 210 at the bottom to facilitate the movement of the diaphragm. As used herein, the term "top" indicates a direction in which sound is emitted. In a case where an earset housing 400 has a hybrid receiver mounted on it, a side where a nozzle 410 is formed is defined as the top, and the opposite side thereof is defined as the bottom.

In this case, the sound emitting hole 220 of the second driver 200 and the sound emitting hole 322 formed in the bracket 300 are configured such that sound emitted from them is directed toward the nozzle 410 of the housing 400.

Moreover, the back hole 210 of the second driver 200 is able to communicate with an upper space 120 of the diaphragm of the first driver 100. This is because the bracket 300 is perforated with the second driver receiving space 330 and therefore the back hole 210 of the second driver 200 is exposed to the upper space 120 of the diaphragm without being blocked by the bracket 300.

However, as long as the back hole 210 and the upper space 120 of the diaphragm of the first driver 100 can communicate with each other, the bracket 300 for installing a driver may have a hole or conduit (not shown) capable of communicating with the back hole 210 of the second driver 200, and the back hole 210 of the second driver 200 may be configured to communicate with the upper space 120 of the diaphragm of the first driver 100 through the hole or conduit formed in the bracket 300 for installing a driver.

Additionally, the side wall 310 of the bracket 300 has a communicating hole 312 through which air flows into or out of the upper space 120 of the diaphragm of the first driver 100. The air in the upper space 120 of the diaphragm and in the housing 400 flows in or out through the communicating hole 312.

Accordingly, a space that allows air to be communicated to the back hole 210 of the second driver 200 is used as the back volume of the second driver 200, thereby increasing the back volume of the second driver 200.

In this case, a mesh 314 for adjusting the airflow of the communicating hole 312 is attached to the communicating hole 312. By merely adjusting the airflow of the mesh 314 without changing the overall structure of the hybrid receiver, the acoustic characteristics of the hybrid receiver can be easily tuned.

Figure 5:
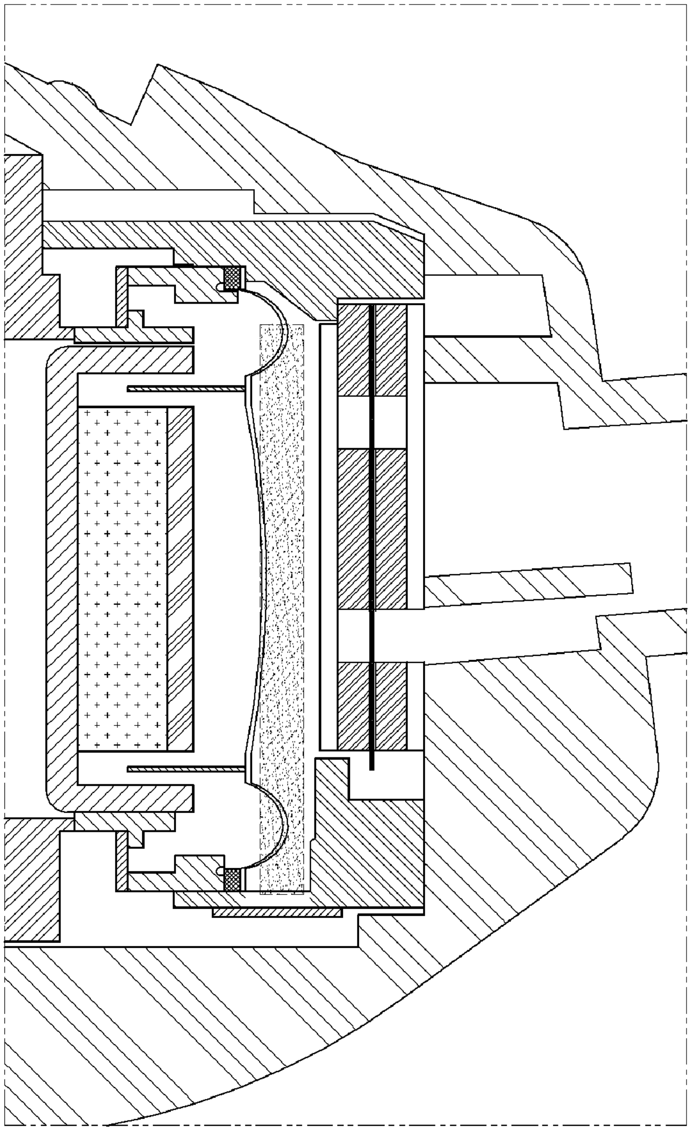
FIG. 5 is a cross-sectional view showing the back volume of a second driver of a hybrid receiver according to the conventional art.

FIG. 5 is a view showing the back volume of a second driver of a hybrid receiver according to the conventional art.

Figure 6:
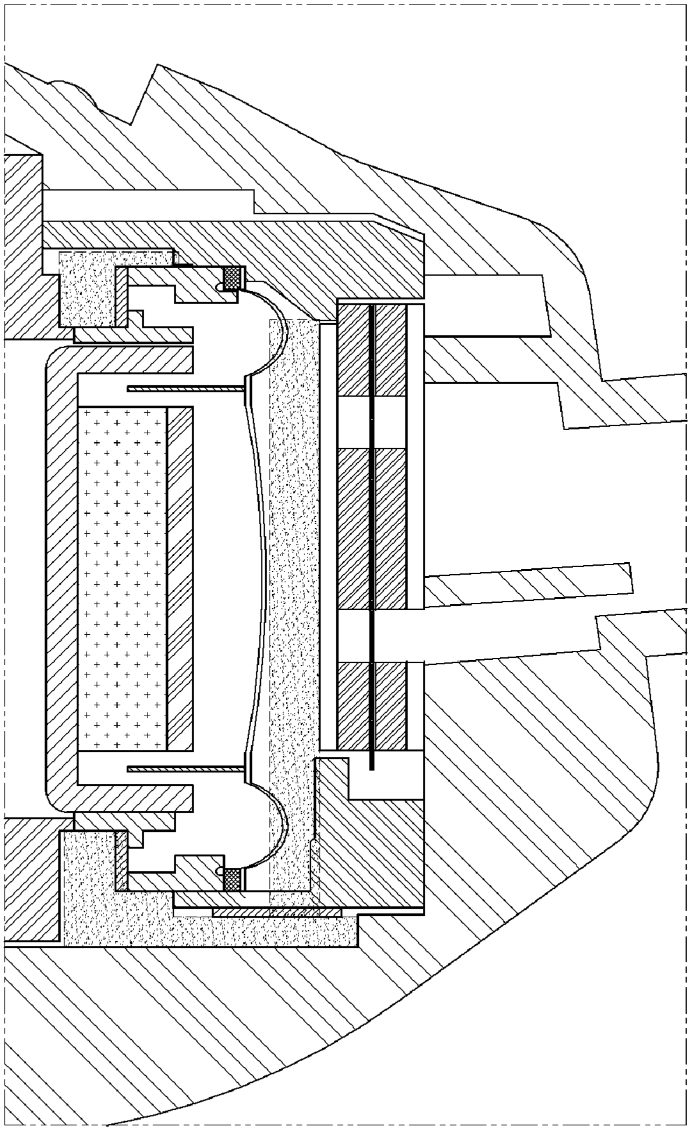
FIG. 6 is a cross-sectional view showing the back volume of a second driver of a hybrid receiver according to an embodiment.

FIG. 6 is a view showing the back volume of a second driver of a hybrid receiver according to an embodiment.

In the drawings, the part indicated in blue is a space that can be used as the back volume of the second driver, from which it can be inferred that the second driver according to the present disclosure has a larger back volume as compared with the conventional art, because of the communicating hole formed in the side wall of the bracket.

Figure 7:
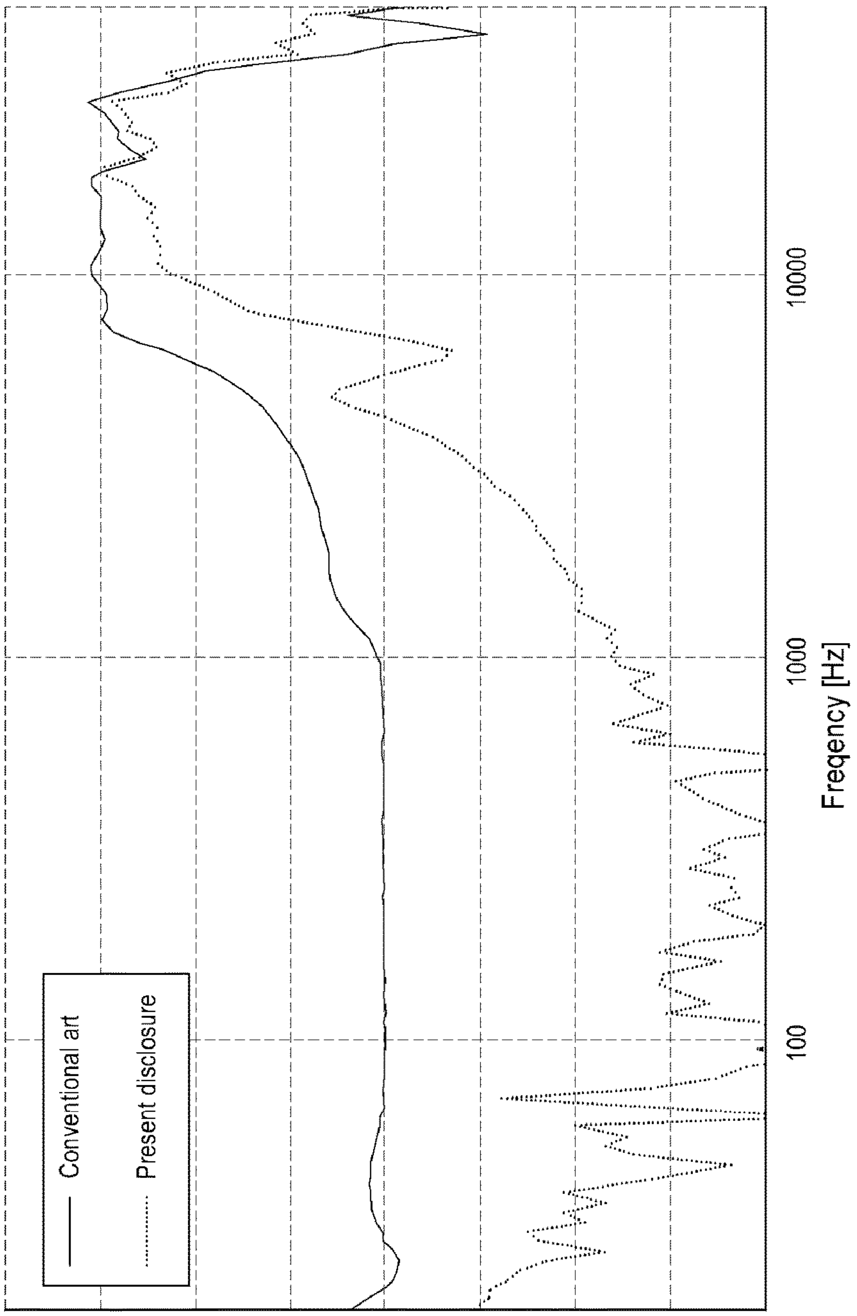
FIG. 7 is a sound pressure level vs. frequency graph comparing a hybrid receiver according to the conventional art and a hybrid receiver according to an embodiment.

FIG. 7 is a sound pressure level vs. frequency graph comparing a hybrid receiver according to the conventional art and a hybrid receiver according to an embodiment, from which it can be inferred that the present disclosure achieves higher sound pressure levels at low frequencies as compared with the conventional art, because of the communicating hole formed in the side wall of the bracket.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A hybrid receiver, comprising:

a first driver configured to reproduce sound in a first frequency range;

a second driver configured to reproduce sound in a second frequency range which is higher than the first frequency range; and a bracket comprising a side wall covering a side of the first driver, an upper side attached to a top of a diaphragm of the first driver, and a sound emitting hole formed in the upper side and configured to emit sound produced by the first driver, wherein a second driver receiving space is provided in the upper side of the bracket, wherein a back hole of the second driver received in the second driver receiving space communicates with an upper space of the diaphragm of the first driver, wherein a communicating hole is formed in the side wall of the bracket and through which air flows in or out of the upper space of the diaphragm of the first driver.

2. The hybrid receiver of claim 1, further comprising a mesh attached to the communicating hole, the airflow of which is adjustable.

3. The hybrid receiver of claim 1, wherein the second driver has a sound emitting hole configured to emit sound in a same direction as the sound emitting hole of the first driver.

4. The hybrid receiver of claim 1, wherein the back hole of the second driver communicates directly with the upper space of the diaphragm of the first driver.

5. The hybrid receiver of claim 1, wherein the bracket further comprises a hole or conduit configured to communicate with the back hole of the second driver, and wherein the back hole of the second driver communicates with the upper space of the diaphragm of the first driver through the hole or conduit formed in the bracket.

* * * * *